(12) United States Patent
Iwahori et al.

(10) Patent No.: US 10,196,503 B2
(45) Date of Patent: Feb. 5, 2019

(54) VINYL CHLORIDE RESIN COMPOSITION FOR POWDER MOLDING, VINYL CHLORIDE RESIN MOLDED ARTICLE AND LAMINATE

(71) Applicant: ZEON CORPORATION, Tokyo (JP)

(72) Inventors: Takahisa Iwahori, Tokyo (JP); Yuya Kitagawa, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 14/650,984

(22) PCT Filed: Nov. 15, 2013

(86) PCT No.: PCT/JP2013/080861
§ 371 (c)(1),
(2) Date: Jun. 10, 2015

(87) PCT Pub. No.: WO2014/091867
PCT Pub. Date: Jun. 19, 2014

(65) Prior Publication Data
US 2015/0322244 A1    Nov. 12, 2015

(30) Foreign Application Priority Data

Dec. 12, 2012  (JP) ................ 2012-270927

(51) Int. Cl.
| | |
|---|---|
| *B32B 5/18* | (2006.01) |
| *C08K 3/26* | (2006.01) |
| *C08K 5/12* | (2006.01) |
| *B29C 41/18* | (2006.01) |
| *B32B 27/06* | (2006.01) |
| *B32B 27/30* | (2006.01) |
| *B32B 27/40* | (2006.01) |
| *B60K 37/00* | (2006.01) |
| *C08K 13/02* | (2006.01) |
| *C08K 5/098* | (2006.01) |
| *C08L 27/06* | (2006.01) |
| *C08L 63/00* | (2006.01) |

(52) U.S. Cl.
CPC .............. *C08K 13/02* (2013.01); *B29C 41/18* (2013.01); *B32B 5/18* (2013.01); *B32B 27/065* (2013.01); *B32B 27/304* (2013.01); *B32B 27/40* (2013.01); *B60K 37/00* (2013.01); *C08K 3/26* (2013.01); *C08K 5/098* (2013.01); *C08K 5/12* (2013.01); *C08L 63/00* (2013.01); *B32B 2250/02* (2013.01); *B32B 2250/24* (2013.01); *Y10T 428/249992* (2015.04)

(58) Field of Classification Search
CPC ......... B32B 27/065; B32B 5/18; B32B 27/40; B32B 27/304; C08K 13/02
See application file for complete search history.

(56) References Cited

U.S. PATENT DOCUMENTS

| | | | | |
|---|---|---|---|---|
| 4,543,420 A | * | 9/1985 | Godwin ............... | C08K 5/12 524/298 |
| 5,036,124 A | | 7/1991 | Igarashi et al. | |
| 5,994,439 A | | 11/1999 | Masuda et al. | |
| 2010/0256278 A1 | * | 10/2010 | Harada ............... | C08K 5/053 524/387 |
| 2010/0272984 A1 | * | 10/2010 | Hada ................... | C08K 5/12 428/319.3 |
| 2013/0089728 A1 | * | 4/2013 | Kobayashi .......... | B32B 27/304 428/319.3 |

FOREIGN PATENT DOCUMENTS

| | | |
|---|---|---|
| EP | 2248854 A1 | 11/2010 |
| JP | 56-47443 A | 4/1981 |
| JP | 61-235448 A | 10/1986 |
| JP | 2-138355 A | 5/1990 |
| JP | 4-26303 B2 | 5/1992 |
| JP | 8-90697 A | 4/1996 |
| JP | 10-306187 A | 11/1998 |
| JP | 2000-95912 A | 4/2000 |
| JP | 2007-216506 A | 8/2007 |
| JP | WO 2012020618 A1 * | 2/2012 ........... B32B 27/304 |
| JP | 2012-197394 A | 10/2012 |
| WO | WO 2009/107463 A1 | 9/2009 |

OTHER PUBLICATIONS

International Preliminary Report on Patentability and English translation of the Written Opinion of the International Searching Authority (forms PCT/IB/373, PCT/ISA/237 and PCT/IB/338), dated Jun. 16, 2015, for International Application No. PCT/JP2013/080861.
International Search Report (form PCT/ISA/210), dated Jan. 21, 2014, for International Application No. PCT/JP2013/080861.
Extended European Search Report dated Jun. 16, 2016, issued in corresponding European Patent Application No. 13863570.1.
European Office Action, dated Jul. 7, 2017, for corresponding European Application No. 13863570.1.

* cited by examiner

*Primary Examiner* — Hai Vo
(74) *Attorney, Agent, or Firm* — Birch, Stewart, Kolasch & Birch, LLP

(57) ABSTRACT

A vinyl chloride resin composition of the present invention for powder molding comprises: 100 parts by mass of (a) vinyl chloride resin particles having an average polymerization degree of 2300 to 4100; and 100 parts by mass to 200 parts by mass of (b) a plasticizer containing a trimellitate plasticizer and/or a pyromellitate plasticizer.

17 Claims, No Drawings

VINYL CHLORIDE RESIN COMPOSITION FOR POWDER MOLDING, VINYL CHLORIDE RESIN MOLDED ARTICLE AND LAMINATE

TECHNICAL FIELD

The present invention relates to (i) a vinyl chloride resin composition for powder molding, which is capable of providing a skin material which has a long-term thermal aging resistance even in a case where a polyurethane foam layer is stacked, (ii) a vinyl chloride resin molded article obtained by subjecting the vinyl chloride resin composition for powder molding to powder slush molding, and (iii) a laminate in which the vinyl chloride resin molded article and a polyurethane foam molded article are stacked.

BACKGROUND ART

An automobile instrument panel has a structure in which a polyurethane foam layer is provided between a skin made of vinyl chloride resin and a substrate. The skin made of vinyl chloride resin changes in color and deteriorates in thermal aging resistance over time. One of factors causing such a change in color and the like of the skin is a chemical reaction that occurs in association with a transfer of tertiary amine to the skin made of vinyl chloride resin, which tertiary amine has been used as a catalyst during formation of the polyurethane foam layer. In order to prevent the change in color of the skin, studies were made as to an urethane-integrated foaming molded article in which a particulate catching agent for capturing a volatile organic compound generated in the polyurethane foam layer is (i) covered with a sheet having continuous air bubbles and (ii) provided in the vicinity of a part of an end of the polyurethane foam layer at which part the end of the polyurethane foam layer is sealed with the skin material and the substrate (see, for example, Patent Literature 1). However, the urethane-integrated foaming molded article has a part where the skin is in contact with the polyurethane foam layer. This makes it impossible to prevent, for a long period of time, the change in color of the skin material which change is caused by the chemical reaction, thereby deteriorating the thermal aging resistance of the skin material.

Further, studies were made as to a laminate in which (i) a foaming layer made of synthetic resin is provided so as to join a core material and a skin and (ii) holes, from which gas generated in the foaming layer is to be discharged, are formed in the core material (see, for example, Patent Literature 2). However, the laminate has a part where the skin is in contact with the foaming layer. This makes it impossible to prevent, for a long period of time, a change in color of the skin material which change is caused by the chemical reaction, thereby deteriorating thermal aging resistance of the skin material.

Furthermore, studies were made as to a molded article made up of (i) a polyurethane molded article, (ii) a skin layer which contains vinyl chloride resin and covers at least a part of a surface of the polyurethane molded article, and (iii) a layer of an amine catching agent sandwiched between the polyurethane molded article and the skin layer (see, for example, Patent Literature 3). However, the amine catching agent easily volatilizes, and it is impossible to prevent, for a long period of time, a transfer of tertiary amine to the skin layer made of the vinyl chloride resin. This makes it impossible to prevent, for a long period of time, a change in color of the skin layer which change is caused by the chemical reaction, thereby deteriorating thermal aging resistance of the skin layer.

Moreover, a vinyl chloride resin composition for powder molding, in which a specific trimellitate plasticizer is mixed, was studied as a raw material for a skin material of an automobile interior material (see, for example, Patent Literature 4). In order to improve thermal aging resistance of the skin material obtained by powder molding of the vinyl chloride resin composition for powder molding, it is necessary to increase an amount of the trimellitate plasticizer mixed. Such increase in the amount of the trimellitate plasticizer mixed causes stickiness due to the trimellitate plasticizer. Furthermore, studies were made as to a vinyl chloride resin composition for powder molding which contains (i) 100 parts by mass of vinyl chloride resin particles made of vinyl chlorine resin having an average polymerization degree of not less than 1500 and (ii) 110 parts by mass to 150 parts by mass of a specific trimellitate plasticizer (for example, see Patent Literature 5).

CITATION LIST

Patent Literatures

Patent Literature 1
Japanese Patent Application Publication, Tokukai, No. 2007-216506
Patent Literature 2
Japanese Patent Application Publication, Tokukaihei, No. 8-90697 (1996)
Patent Literature 3
Japanese Examined Patent Application Publication, Tokukouhei, No. 4-26303 (1992)
Patent Literature 4
Japanese Patent Application Publication, Tokukaihei, No. 2-138355 (1990)
Patent Literature 5
International Publication No. WO 2009/107463

SUMMARY OF INVENTION

Technical Problem

Recently, an automobile instrument panel skin, in which a polyurethane foam layer is stacked, has been required to have an improved thermal aging resistance. However, an automobile instrument panel having a skin that sufficiently meets such requirements has not been realized.

An object of the present invention is to provide a vinyl chloride resin composition for powder molding, which is capable of providing a molded article that has an excellent thermal aging resistance even in a case where a polyurethane foam layer is stacked. Another object of the present invention is to provide (i) a vinyl chloride resin molded article which is obtained by subjecting the vinyl chloride resin composition for powder molding to powder slush molding and has an excellent thermal aging resistance even in a case where a polyurethane foam layer is stacked on this vinyl chloride resin molded article, and (ii) a laminate in which the vinyl chloride resin molded article and a polyurethane foam molded article are stacked.

Solution to Problem

In order to attain the objects, the inventors of the present invention diligently studied, and as a result, found that a skin material having a particularly excellent thermal ageing resistance can be given by a vinyl chloride resin composition for powder molding that comprises (a) vinyl chloride resin particles having an average polymerization degree of 2300 to 4100 and (b) a plasticizer containing a trimellitate plasticizer and/or a pyromellitate plasticizer. Consequently, the inventors have completed the present invention.

The present invention is a vinyl chloride resin composition for powder molding, comprising: 100 parts by mass of (a) vinyl chloride resin particles having an average polymerization degree of 2300 to 4100; and 100 parts by mass to 200 parts by mass of (b) a plasticizer containing a trimellitate plasticizer and/or a pyromellitate plasticizer.

Moreover, the present invention is a vinyl chloride resin molded article obtained by subjecting, to powder slush molding, the vinyl chloride resin composition for powder molding.

Furthermore, the present invention is a laminate in which a polyurethane foam molded article and the vinyl chloride resin molded article are stacked.

Advantageous Effects of Invention

A vinyl chloride resin composition of the present invention for powder molding provides a skin material having a long-term thermal ageing resistance even in a case where a polyurethane foam layer is stacked.

DESCRIPTION OF EMBODIMENTS

A vinyl chloride resin composition of the present invention for powder molding contains (a) vinyl chloride resin particles having an average polymerization degree of 2300 to 4100 (hereinafter, also referred to simply as "(a) vinyl chloride resin particles"). A vinyl chloride resin constituting (a) the vinyl chloride resin particles includes not only a homopolymer of vinyl chloride but also a copolymer that contains preferably not less than 50 percent by mass of vinyl chloride unit, or more preferably not less than 70 percent by mass of vinyl chloride unit. Specific examples of comonomers of such a vinyl chloride copolymer include: olefins such as ethylene and propylene; olefin halides such as allyl chloride, vinylidene chloride, vinyl fluoride, and ethylene chloride trifluoride; carboxylic acid vinyl esters such as vinyl acetate and vinyl propionate; vinyl ethers such as isobutyl vinyl ether and cetyl vinyl ether; allyl ethers such as allyl-3-chloro-2-oxypropyl ether and allyl glycidyl ether; unsaturated carboxylic acids, esters thereof, and acid anhydrides thereof such as acrylic acid, maleic acid, itaconic acid, acrylic acid-2-hydroxyethyl, methyl methacrylate, monomethyl maleate, diethyl maleate, and maleic anhydride; unsaturated nitriles such as acrylonitrile and methacrylonitrile; acrylic amides such as acrylic amide, N-methylol acrylic amide, acrylic amide-2-methyl propane sulfonic acid, and (meth)acrylamide propyltrimethyl ammonium chloride; allylamines and derivatives thereof such as allylamine benzoate and diallyl dimethyl ammonium chloride; and the like. The above monomers are only parts of monomers capable of copolymerizing with vinyl chloride, and monomers shown on pages 75 to 104 of "Polyvinyl Chloride" (edited by THE KINKI CHEMICAL SOCIETY JAPAN, published by Nikkan Kogyo Shinbun Ltd., (1988)) can be used as the monomers capable of copolymerizing with vinyl chloride. One or a combination of two or more of the monomers can be used. The vinyl chloride resin constituting (a) the vinyl chloride resin particles includes resin obtained by graft-polymerizing resin such as an ethylene-vinyl acetate copolymer, an ethylene-methyl methacrylate copolymer, an ethylene-ethyl acrylate copolymer, or chlorinated polyethylene with (1) vinyl chloride or (2) vinyl chloride and any of the copolymerizable monomers described above.

The vinyl chloride resin constituting (a) the vinyl chloride resin particles can be produced by any of well-known methods such as a suspension polymerization method, an emulsion polymerization method, a solution polymerization method, and a mass polymerization method. Especially, vinyl chloride resin produced by the suspension polymerization method is preferable.

The vinyl chloride resin constituting (a) the vinyl chloride resin particles has an average polymerization degree of 2300 to 4100, preferably 2800 to 4100, more preferably 3100 to 4100, and particularly preferably 3500 to 4100. When the vinyl chloride resin constituting (a) the vinyl chloride resin particles has an average polymerization degree of 2300 to 4100, an excellent thermal ageing resistance can be given to a vinyl chloride resin molded article that is obtained by subjecting the vinyl chloride resin composition for powder molding to powder slush molding. Note that the average polymerization degree is measured in conformity to JIS K 6720-2.

An average particle size of (a) the vinyl chloride resin particles is not especially limited. The average particle size ranges from preferably 50 μm to 500 μm, more preferably from 50 μm to 250 μm, and most preferably from 100 μm to 200 μm. When the average particle size of (a) the vinyl chloride resin particles is 50 μm to 500 μm, powder flowability of the vinyl chloride resin composition for powder molding is excellent, and smoothness of the vinyl chloride resin molded body is improved which vinyl chloride resin molded body is obtained by subjecting the vinyl chloride resin composition for powder molding to powder slush molding. Note that the average particle size of (a) the vinyl chloride resin is measured by classification by use of a JIS standard sieve defined by JIS Z 8801.

A vinyl chloride resin composition of the present invention for powder molding comprises (b) a plasticizer containing a trimellitate plasticizer and/or a pyromellitate plasticizer.

The trimellite plasticizer that can be contained in the vinyl chloride resin composition of the present invention for powder molding is an ester compound of trimellitic acid and monoalcohol. Note that in the present Specification, the wording "A and/or B" means "A, B, or A and B". In other words, the wording means "at least one of A and B".

A specific example of the trimellitic plasticizer is a compound represented by the following formula (1).

[Chem. 1]

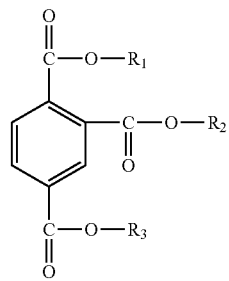

(1)

where: $R_1$ through $R_3$ represent an alkyl group and may be identical with each other or different from each other; a linear chain ratio of $R_1$ through $R_3$ is 90 mol % or more, and preferably 95 mol % or more; a ratio of an alkyl group having 7 carbons or less to all alkyl groups of $R_1$ through $R_3$ ranges from 0 mol % to 10 mol %; a ratio of an alkyl group having 8 or 9 carbons to the all alkyl groups of $R_1$ through $R_3$ ranges from 0 mol % to 95 mol %, preferably 15 mol % to 90 mol %, more preferably 35 mol % to 90 mol %, and still more preferably 60 mol % to 90 mol %; a ratio of an alkyl group having 10 carbons to the all alkyl groups of $R_1$ through $R_3$ ranges from 5 mol % to 100 mol %, preferably 10 mol % to 85 mol %, more preferably 10 mol % to 65 mol %, and still more preferably 10 mol % to 40 mol %; and a ratio of an alkyl group having 11 or more carbons to the all alkyl groups of $R_1$ through $R_3$ ranges from 0 mol % to 10 mol %; and the linear chain ratio of $R_1$ through $R_3$ is a ratio of a linear chain alkyl group to the all alkyl groups of $R_1$ through $R_3$.

Specific examples of the linear chain alkyl group include a methyl group, an ethyl group, an n-propyl group, an n-butyl group, an n-pentyl group, an n-hexyl group, an n-heptyl group, an n-octyl group, an n-nonyl group, an n-decyl group, an n-undecyl group, an n-dodecyl group, an n-tridecyl group, an n-hexadecyl group, an n-pentadecyl group, an n-hexadecyl group, an n-heptadecyl group, an n-stearyl group, and the like. Specific examples of a branched alkyl group include an i-propyl group, an i-butyl group, an i-pentyl group, an i-hexyl group, an i-heptyl group, an i-octyl group, an i-nonyl group, an i-decyl group, an i-undecyl group, an i-dodecyl group, an i-tridecyl group, an i-hexadecyl group, an i-pentadecyl group, an i-hexadecyl group, an i-heptadecyl group, an i-octadecyl group, a t-butyl group, a t-pentyl group, a t-hexyl group, a t-heptyl group, a t-octyl group, a t-nonyl group, a t-decyl group, a t-undecyl group, a t-dodecyl group, a t-tridecyl group, a t-hexadecyl group, a t-pentadecyl group, a t-hexadecyl group, a t-heptadecyl group, a t-octadecyl group, a 2-ethylhexyl group, and the like.

The trimellitate plasticizer may be a single compound or may be a mixture of plural components. In general, commercially available trimellitate plasticizers are mixtures. Among such commercially-available mixtures, a mixture which meets the above requirements is preferably selected. A specific example of the commercially-available trimellitate plasticizers is TRIMEX N-08 produced by Kao Corporation.

The pyromellitate plasticizer that the vinyl chloride resin composition of the present invention for powder molding can contain is an ester compound of pyromellitic acid and monovalent alcohol. Specific examples of the pyromellitate plasticizer include pyromellitic acid tetra alkyl esters such as pyromellitic acid tetra-n-hexyl, pyromellitic acid tetra-n-octyl, pyromellitic acid tetra-(2-ethylhexyl), pyromellitic acid tetra-n-decyl, pyromellitic acid tetra-i-decyl, and pyromellitic acid-n-alkyl (C7 to C10 mixed) ester. Among them, the pyromellitate plasticizer is preferably a pyromellitic acid tetra alkyl ester whose ester group has 6 to 10 carbons, more preferably a pyromellitic acid tetra alkyl ester whose ester group has 8 to 10 carbons such as pyromellitic acid tetra-n-octyl, pyromellitic acid tetra-(2-ethylhexyl) or pyromellitic acid tetra-n-decyl, and still more preferably, a pyromellitic acid tetra alkyl ester having 8 carbons such as pyromellitic acid tetra-n-octyl or pyromellitic acid tetra-(2-ethlyhexyl). The trimellitate plasticizer may be a single compound or may be a mixture of plural components.

An addition amount of (b) the plasticizer which contains the trimellitate plasticizer and/or the pyromellitate plasticizer ranges from 100 parts by mass to 200 parts by mass, preferably from 130 parts by mass to 200 parts by mass, more preferably from 150 parts by mass to 200 parts by mass, and still more preferably from 160 parts to 200 parts by mass with respect to 100 parts by mass of (a) the vinyl chloride resin particles. In a case where an addition amount of (b) the plasticizer which contains the trimellitate plasticizer and/or the pyromellitate plasticizer is 100 parts by mass to 200 parts by mass, an excellent thermal ageing resistance is obtained for the vinyl chloride resin molded article which is obtained by subjecting the vinyl chloride resin composition for powder molding to powder slush molding. Further, at the above addition amount of (b) the plasticizer which contains the trimellitate plasticizer and/or the pyromellitate plasticizer, the plasticizer is well absorbed by (a) the vinyl chloride resin particles. This allows obtaining an excellent powder moldability of the vinyl chloride resin composition for powder molding.

A content ratio of the trimellitate plasticizer and/or the pyromellitate plasticizer in (b) the plasticizer which contains the trimellitate plasticizer and/or the pyromellitate plasticizer is not particularly limited. However, preferably, a content of the trimellitate plasticizer is 0 part by mass to 180 parts by mass and a content of the pyromellitate plasticizer is 0 part by mass to 180 parts by mass with respect to 100 parts by mass of (a) the vinyl chloride resin particles. More preferably, a content of the trimellitate plasticizer is 0 part by mass to 180 parts by mass and a content of the pyromellitate plasticizer is 0 part by mass to 160 parts by mass with respect to 100 parts by mass of (a) the vinyl chloride resin particles.

The vinyl chloride resin composition of the present invention for powder molding can contain a plasticizer (hereinafter, also referred to as "the other plasticizer") except the trimellitate plasticizer and the pyromellitate plasticizer. Specific examples of the other plasticizer include: epoxidized vegetable oils such as epoxidized soybean oil and epoxidized flax seed oil; phthalic acid derivatives such as dimethyl phthalate, diethyl phthalate, dibutyl phthalate, di-(2-ethylhexyl)phthalate, di-n-octyl phthalate, diisobutyl phthalate, diheptyl phthalate, diphenyl phthalate, diisodecyl phthalate, ditridecyl phthalate, diundecyl phthalate, dibenzyl phthalate, butyl benzyl phthalate, dinonyl phthalate, and dicyclohexyl phthalate; isophthalic acid derivatives such as dimethyl isophthalate, di-(2-ethylhexyl)isophthalate, and diisooctyl isophathalate; tetrahydro phthalic acid derivatives such as di-(2-ethylhexyl)tetrahydro phthalate, di-n-octyl tetrahydro phthalate, and diisodecyl tetrahydro phthalate; adipic acid derivatives such as di-n-butyl adipate, di(2-ethylhexyl)adipate, diisodecyl adipate, and diisononyl adipate; azelaic acid derivatives such as di-(2-ethylhexyl)azelate, diisooctyl azelate, and di-n-hexyl azelate; sebacic acid derivatives such as di-n-butyl sebacate, di-(2-ethylhexyl) sebacate, diisodecyl sebacate, and di-(2-butyloctyl)sebacate; maleic acid derivatives such as di-n-butyl maleate, dimethyl maleate, diethyl maleate, and di-(2-ethylhexyl)maleate; fumaric acid derivatives such as di-n-butyl fumarate, and di-(2-ethylhexyl)fumarate; citric acid derivatives such as triethyl citrate, tri-n-butyl citrate, acetyl triethyl citrate, and acetyl tri-(2-ethylhexyl)citrate; itaconic acid derivatives such as monometyl itaconate, monobutyl itaconate, dimethyl itaconate, diethyl itaconate, dibutyl itaconate, and di-(2-ethylhexyl)itaconate; oleic acid derivatives such as butyl oleate, glyceryl monooleate, and diethylene glycol monooleate; ricinoleic acid derivatives such as methyl acetyl ricinoleate, butyl acetyl ricinoleate, glyceryl monoricinoleate, and diethylene glycol monoricinoleate; stearic acid derivatives such as n-butyl stearate and diethylene glycol distearate; fatty acid derivatives such as diethylene glycol monolaurate, diethylene glycol dipelargonate, and pentaerythritol fatty acid ester; phospholic acid derivatives such as triethyl phosphate, tributyl phosphate, tri-(2-ethylhexyl) phosphate, tributoxyethyl phosphate, triphenyl phosphate, cresyl diphenyl phosphate, tricresyl phosphate, trixylenyl phosphate, and tris(chloroethyl)phosphate; glycol derivatives such as diethylene glycol dibenzoate, dipropyrene glycol dibenzoate, triethylene glycol dibenzoate, triethylene glycol di-(2-ethylbutylate), triethylene glycol di-(2-ethylhexoate), and dibutyl methylene bisthioglycolate; glycerin derivatives such as glycerol monoacetate, glycerol triacetate, and glycerol tributylate; epoxy derivatives such as epoxy hexahydro diisodecyl phthalate, epoxy triglyceride, epoxidized octyl oleate, and epoxidized decyl oleate; so-called primary plasticizers such as polyester plasticizers including polyester adipate, polyester sebacate, and polyester phthalate; so-called secondary plasticizers such as chlorinated paraffin, fatty acid ester of glycol (such as triethylene glycol dicaprylate), butyl epoxy stearate, phenyl oleate, and dihydro methyl abietate; and the like. In particular, epoxidized vegetable oils are preferable, and epoxidized soybean oil is more preferable. One or a combination of two or more of the above plasticizers can be used as the other plasticizer. In a case where the secondary plasticizer is used, it is preferable to use in combination the primary plasticizer in a mass equal to or larger than that of the secondary plasticizer.

A content ratio of the other plasticizer to (b) the plasticizer which contains the trimellitate plasticizer and/or the pyromellitate plasticizer is preferably 10 percent by mass, more preferably 1 percent by mass to 10 percent by mass, and still more preferably 2 percent by mass to 5 percent by mass.

The vinyl chloride resin composition of the present invention for powder molding may contain, as a release agent, saturated fatty acid having a hydroxyl group and/or metallic soap. Specific examples of the saturated fatty acid having a hydroxyl group include hydroxy stearic acid, hydroxy myristic acid, hydroxy lauric acid, and the like. Specific examples of the metallic soap include lithium stearate, magnesium stearate, aluminum stearate, calcium stearate, strontium stearate, barium stearate, zinc stearate, calcium laurate, barium laurate, zinc laurate, barium 2-ethyl hexanoate, zinc 2-ethyl hexanoate, barium ricinoleate, zinc ricinoleate, and the like. The metallic soap is preferably a metal salt of fatty acid, more preferably a polyvalent metal salt of fatty acid, and still more preferably zinc salt of fatty acid. The vinyl chloride resin composition of the present invention for powder molding can contain one or a combination of two or more of the saturated fatty acids having a hydroxyl group and/or the metallic soaps. A content of the saturated fatty acid having a hydroxyl group and/or the metallic soap is not limited to a specific range. However, the content is preferably in a range of 0.1 part by mass to 3 parts by mass, with respect to 100 parts by mass of (a) the vinyl chloride resin particles.

The vinyl chloride resin composition of the present invention for powder molding may contain hydrotalcite as a stabilizer. The hydrotalcite is a non-stoichiometric compound represented by general formula $[Mg_{1-x}Al_x(OH)_2]^{x+}[(CO_3)_{x/2}.mH_2O]^{x-}$. The hydrotalcite is an inorganic substance having a layered crystalline structure in which a positively charged basic layer represented by $[Mg_{1-x}Al_x(OH)_2]^{x+}$ and a negatively charged intermediate layer represented by $[(CO_3)_{x/2}.mH_2O]^{x-}$ are stacked. Note here that x is more than 0 and not more than 0.33. Natural hydrotalcite is represented by $Mg_6Al_2(OH)_{16}CO_3.4H_2O$. Synthesized hydrotalcite is represented by $Mg_{4.5}Al_2(OH)_{13}CO_3.3.5H_2O$, which is commercially available. A method of synthesizing the synthesized hydrotalcite is described in Japanese Examined Patent Application Publication, Tokukousho, No. 61-174270. The hydrotalcite may be subjected to a perchloric acid treatment.

A content of the hydrotalcite is not limited to a specific range. It is, however, preferable that the content of the hydrotalcite be in a range of 0.5 part by mass to 10 parts by mass with respect to 100 parts by mass of (a) the vinyl chloride resin particles.

The vinyl chloride resin composition of the present invention for powder molding may contain zeolite as a stabilizer. The zeolite is represented by general formula:

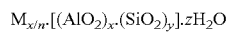

$$M_{x/n}.[(AlO_2)_x.(SiO_2)_y].zH_2O$$

where M represents a metal ion having a valence of n and x+y represents the number of tetrahedrons per unit lattice. Specific examples of M in the above general formula include (i) monovalent or divalent metal ions of sodium, lithium, calcium, magnesium, zinc or the like and (ii) a combination of these metal ions.

A content of the zeolite is not limited to a specific range. It is, however, preferable that the content of the zeolite is in a range of 0.1 part by mass to 5 parts by mass with respect to 100 parts by mass of (a) the vinyl chloride resin particles.

The vinyl chloride resin composition of the present invention for powder molding may contain a dusting agent (powder flowability reforming agent). Specific examples of the dusting agent include: inorganic fine particles of calcium carbonate, talc, aluminum oxide and the like; and organic fine particles such as vinyl chloride resin fine particles, polyacrylonitrile resin fine particles, poly(meth)acrylate resin fine particles, polystyrene resin fine particles, polyethylene resin fine particles, polypropylene resin fine particles, polyester resin fine particles, and polyamide resin fine particles. In particular, inorganic fine particles whose average particle size ranges from 10 nm to 100 nm, and vinyl chloride resin fine particles whose average particle size ranges from 0.1 μm to 10 μm are preferable. A polymerization degree of vinyl chloride resin which constitutes the vinyl chloride resin fine particles serving as the dusting agent preferably ranges from 500 to 2000, and more preferably from 700 to 1500. A content of the vinyl chloride resin fine particles serving as the dusting agent is not limited to a specific range. However, the content of the vinyl chloride resin particles is preferably not more than 35 parts by mass, more preferably not more than 30 parts by mass, still more preferably not less than 10 parts by mass and not more than 30 parts by mass, and particularly preferably not less than 10 parts by mass and not more than 25 parts by mass, with respect to 100 parts by mass of (a) the vinyl chloride resin particles.

The vinyl chloride resin composition of the present invention for powder molding may contain other additives such as a coloring agent, an impact resistance reforming agent, a perchloric acid compound (e.g. sodium perchlorate, potassium perchlorate), an oxidization inhibitor, an antifungal agent, a flame retardant, an antistatic agent, a filler, an ultraviolet absorber, a light stabilizer, a foaming agent, and a β-diketone.

Specific examples of the coloring agent include quinacridone pigment, perylene pigment, polyazo condensation pigment, isoindolinon pigment, copper phthalocyanine pigment, titanium white, and carbon black. One or a combination of two or more of the pigments is/are used as the coloring agent. The quinacridone pigment is obtained by treating p-phenylene dianthranilates with concentrated sulfuric acid, and shows yellowish red to reddish purple. Specific examples of the quinacridone pigment include quinacridon red, quinacridon magenta, and quinacridon violet. The perylene pigment is obtained by condensation reaction of perylene-3,4,9,10-tetracarbolic acid anhydride with aromatic primary amine, and shows red to reddish purple and brown. Specific examples of the perylene pigment include perylene red, perylene orange, perylene maroon, perylene vermilion, and perylene bordeaux. The polyazo condensation pigment is obtained by condensing azo pigment in a solvent to have high molecular weight, and shows yellow or red. Specific examples of the polyazo condensation pigment include polyazo red, polyazo yellow, chromophthal orange, chromophthal red, and chromophthal scarlet. The isoindolinon pigment is obtained by condensation reaction of 4,5,6,7-tetrachloroisoindolinon with aromatic primary diamine, and shows greenish yellow to red and brown. A specific example of the isoindolinon pigment is isoindolinon yellow. The copper phthalocyanine pigment is a pigment in which copper is coordinated to phthalocyanines, and shows yellowish green to vivid blue. Specific examples of the copper phthalocyanine pigment include phthalocyanine green, and phthalocyanine blue. The titanium white is a white pigment made from titanium dioxide, has a great hiding power, and is of anatase-type or rutile-type. The carbon black mainly contains carbon, and is a black pigment containing oxygen, hydrogen, and nitrogen. Specific examples of the carbon black include thermal black, acetylene black, channel black, furnace black, lamp black, and bone black.

Specific examples of the impact resistance reforming agent include acrylonitrile-butadiene-styrene copolymer, methyl methacrylate-butadiene-styrene copolymer, chlorinated polyethylene, vinyl chloride-grafted ethylene-vinyl acetate copolymer, ethylene-vinyl acetate copolymer, chlorosulfonated polyethylene, and the like. One or a combination of two or more of the impact resistance reforming agents can be used. The impact resistance reforming agent becomes non-uniformly dispersed elastic fine particles in a vinyl chloride resin composition for powder molding. A chain and a polar group which are graft-polymerized with the elastic fine particles are dissolved with (a) the vinyl chloride resin particles, thereby improving impact resistance of the vinyl chloride resin composition for powder molding.

Specific examples of the oxidization inhibitor include a phenolic oxidization inhibitor, a sulfur oxidization inhibitor, a phosphorous oxidization inhibitor, and the like.

Specific examples of the antifungal agent include an aliphatic ester antifungal agent, a hydrocarbon antifungal agent, an organic nitrogen antifungal agent, an organic nitrogen sulfur antifungal agent, and the like.

Specific examples of the flame retardant include a halogen flame retardant such as chlorinated paraffin, a phosphorous flame retardant such as phosphate ester, inorganic hydroxides such as magnesium hydroxide and aluminum hydroxide, and the like.

Specific examples of the antistatic agent include: anionic antistatic agents such as fatty acid salts, higher alcohol sulfate esters, and sulfonates; cationic antistatic agents such as aliphatic amine salts, and quaternary ammonium salts; nonionic antistatic agents such as polyoxyethylenealkylethers, and polyoxyethylene alkylphenolethers; and the like.

Specific examples of the filler include silica, talc, mica, calcium carbonate, clay, and the like.

Specific examples of the light stabilizer include ultraviolet absorbers of benzotriazol, benzophenone, nickel chelate, etc., a hindered amine light stabilizer, and the like.

Specific examples of the foaming agent include: organic foaming agents such as azo compounds (e.g. azodicarbonamide, azobisisobutyronitrile), nitroso compounds (e.g. N,N'-dinitroso pentamethylene tetramine), sulfonylhydrazide compounds (e.g. p-toluenesulfonylhydrazide, p,p-oxybis (benzenesulfonylhydrazide); gaseous foaming agents such as volatile hydrocarbon compounds (e.g. pentane), CFC gas, carbon dioxide gas, water, and microcapsules including the gaseous foaming agents; and the like.

The β-diketone is used to more effectively prevent change in initial color of a vinyl chloride resin molded article obtained by powder molding the vinyl chloride resin composition of the present invention for powder molding. Specific examples of the β-diketone include dibenzoylmethane, stearoylbenzoylmethane, palmitoylbenzoylmethane, and the like. One or a combination of two or more of the β-diketones may be used.

A content of the β-diketone is not limited to a specific range. It is, however, preferable that the content of the β-diketone be in a range of 0.1 part by mass to 5 parts by mass with respect to 100 parts by mass of (a) the vinyl chloride resin particles.

A method for mixing (a) the vinyl chloride resin particles, (b) the plasticizer which contains the trimellitate plasticizer and/or the pyromellitate plasticizer, and the other additives to be added if necessary, is not limited. It is, however, preferable that the method be dry blend. Further, it is preferable to use a Henschel mixer for the dry blend. Furthermore, during the dry blend, temperature is preferably in a range of 50° C. to 100° C., and more preferably in a range of 70° C. to 80° C.

The vinyl chloride resin molded article of the present invention is obtained by subjecting the vinyl chloride resin composition of the present invention for powder molding to powder slush molding (also referred to as "powder molding" in the present invention). During the powder slush molding, temperature of a mold is preferably in a range of 200° C. to 300° C., and more preferably in a range of 220° C. to 280° C. The vinyl chloride resin molded article of the present invention is suitably obtainable, for example, as below. First, the vinyl chloride resin composition of the present invention for powder molding is sprinkled on the mold having the temperature of the mold, and let stand for 5 seconds to 30 seconds. Thereafter, surplus of the vinyl chloride resin composition is shaken off from the mold, and then the resultant vinyl chloride resin composition in the mold is let stand for 30 seconds to 3 minutes. Thereafter, the mold is cooled down to 10° C. to 60° C., and then the vinyl chloride resin molded article of the present invention is removed from the mold. The vinyl chloride resin molded article of the present invention is suitably applicable to skins of automobile interior materials such as an instrument panel and a door trim.

A laminate of the present invention is obtained by stacking the vinyl chloride resin molded article of the present invention and a polyurethane foam molded article. Examples of the method include (i) a first method in which the vinyl chloride resin molded article and the polyurethane foam molded article are bonded by means of thermal fusion or thermal bonding or by use of a conventionally well-known adhesive, after the vinyl chloride resin molded article and the polyurethane foam molded article have been separately produced and (ii) a second method in which polyurethane is foamed on the vinyl chloride resin molded article by a conventionally well-known method while for example, an isocyanate and a polyol as raw materials for the polyurethane foam molded article are being polymerized on the vinyl chloride resin molded article. The second method is simpler, and more preferable than the first method because the second method can surely bond the vinyl chloride resin molded article and the polyurethane foam molded article to each other to form various shapes of the laminate.

The laminate of the present invention is suitably applicable to automobile interior materials such as an instrument panel and a door trim.

The above described vinyl chloride resin composition of the present invention for powder molding is preferably configured such that (a) the vinyl chloride resin particles having the average polymerization degree of 2300 to 4100 have an average polymerization degree of 3100 to 4100.

Moreover, the vinyl chloride resin composition of the present invention for powder molding is preferably configured such that (a) the vinyl chloride resin particles having the average polymerization degree of 2300 to 4100 have an average particle size of 50 μm to 500 μm.

Moreover, the vinyl chloride resin composition of the present invention for powder molding is preferably configured such that (b) the plasticizer containing the trimellitate plasticizer and/or the pyromellitate plasticizer contains: 0 part by mass to 180 parts by mass of the trimellitate plasticizer; and 0 part by mass to 180 parts by mass of the pyromellitate plasticizer.

The vinyl chloride resin composition of the present invention for powder molding is preferably configured such that (b) the plasticizer containing the trimellitate plasticizer and/or the pyromellitate plasticizer contains epoxidized soybean oil.

The vinyl chloride resin composition of the present invention for powder molding preferably comprises 0.1 parts by mass to 3 parts by mass of saturated fatty acid having a hydroxyl group and/or metallic soap with respect to 100 parts by mass of (a) the vinyl chloride resin particles having the average polymerization degree of 2300 to 4100.

The vinyl chloride resin composition of the present invention for powder molding preferably comprises 0.5 part by mass to 10 parts by mass of hydrotalcite with respect to 100 parts by mass of (a) the vinyl chloride resin particles having the average polymerization degree of 2300 to 4100.

The vinyl chloride resin composition of the present invention for powder molding preferably comprises 0.1 part by mass to 5 parts by mass of zeolite with respect to 100 parts by mass of (a) the vinyl chloride resin particles having the average polymerization degree of 2300 to 4100.

The vinyl chloride resin composition of the present invention for powder molding preferably comprises 0.1 part by mass to 5 parts by mass of a β-diketone with respect to 100 parts by mass of (a) the vinyl chloride resin particle having the average polymerization degree of 2300 to 4100.

The vinyl chloride resin composition of the present invention for powder molding preferably comprises not more than 35 parts by mass of a dusting agent with respect to 100 parts by mass of (a) the vinyl chloride resin particles having the average polymerization degree of 2300 to 4100.

The vinyl chloride resin composition of the present invention for powder molding is preferably for use in powder slush molding.

The vinyl chloride resin molded article of the present invention is preferably for use as an automobile instrument panel skin.

The laminate of the present invention is preferably for use in an automobile instrument panel.

EXAMPLES

The following details the present invention by referring to Examples. Note, however, that the present invention is not limited to these Examples.

Examples 1 through 10, and Comparative Examples 1 through 11

Components shown in Tables 1 and 2, except plasticizers and a dusting agent, were mixed in a Henschel mixer. When temperature of thus obtained mixture was increased to 80° C., the plasticizers were added into the Henschel mixer to attain a dry-up (indicating a state where the plasticizers added are absorbed by vinyl chloride resin particles, so that the mixture becomes smooth and dry) composition. Thereafter, when a resultant composition was cooled down to 70° C. or less, the vinyl chloride resin fine particles serving as a dusting agent were added to the composition to prepare a vinyl chloride resin composition for powder molding. The vinyl chloride resin composition for powder molding was sprinkled on a textured mold heated up to 250° C. Then, after the vinyl chloride resin composition was left for 13 seconds to fuse, surplus of the vinyl chloride resin composition was shaken down. Subsequently, at the time when the composition was left still for 60 seconds in an oven set at 200° C. after having been placed in the oven, the mold was cooled down by cooling water. When the mold was cooled down to 40° C., a molded vinyl chloride resin sheet of 205 mm×298 mm×1 mm was released from the mold. The resultant molded vinyl chloride resin sheet was punched through by use of a JIS K 6251 (previously JIS K 6301) No. 1 dumbbell. Elongation at break of the molded vinyl chloride resin sheet thus punched was measured at a testing rate of 200 mm/min and a testing vessel temperature of −35° C. by use of a precision measurement universal tester (Shimadzu Corporation, AGS-X). Another molded vinyl chloride resin sheet of 205 mm×298 mm×1 mm separately prepared was laid in a mold of 210 mm×300 mm×10 mm, and a mixture of 40 parts by mass of modified MDI isocyanate (CEI-264 produced by Nippon Polyurethane Industry Co., Ltd.) and 80 parts by mass of polyether polyol (HC-150 produced by Sanyo Chemical Industrial Co., Ltd.) was poured onto the molded vinyl chloride resin sheet, and the mold was sealed by use of an aluminum plate of 305 mm×395 mm×2 mm. After 5 minutes, a sample was taken out of the mold. In this sample, a 1-mm-thick skin made of the another molded vinyl chloride resin sheet was lined by a 9-mm-thick polyurethane foam molded article having a density of 0.2 g/cm³. Further, after the sample was put in an oven and heated up to 130° C. for 100 hours or 250 hours, a polyurethane foam layer was removed from the sample. Then, elongation at break of the sample was measured in the same manner. The vinyl chloride resin composition was evaluated as having an excellent thermal aging resistance if the elongation at break was 110% or more. Elongation at break of the sample having a longer period of heating time was not measured, in a case where the elongation at break was less than 110%. Results are shown in Tables 1 and 2.

TABLE 1

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Vinyl chloride resin particle A[1] (Parts by mass) | 100 | 100 | 100 | — | — | — | — | — | — | — |
| Vinyl chloride resin particle B[2] (Parts by mass) | — | — | — | 100 | 100 | 100 | — | — | — | — |
| Vinyl chloride resin particle C[3] (Parts by mass) | — | — | — | — | — | — | 100 | 100 | 100 | 100 |
| Vinyl chloride resin particle D[4] (Parts by mass) | — | — | — | — | — | — | — | — | — | — |
| Vinyl chloride resin particle E[5] (Parts by mass) | — | — | — | — | — | — | — | — | — | — |
| Vinyl chloride resin particle F[6] (Parts by mass) | — | — | — | — | — | — | — | — | — | — |
| Plasticizer A (trimellitate)[7] (Parts by mass) | — | 80 | 180 | — | 80 | 160 | — | 65 | 100 | 135 |
| Plasticizer B (pyromellitate)[8] (Parts by mass) | 160 | 80 | — | 150 | 80 | — | 135 | 70 | 35 | — |
| Plasticizer C (epoxidized soybean oil)[9] (Parts by mass) | 5 | 5 | 5 | 5 | 5 | 5 | 5 | 5 | 5 | 5 |
| Perchloric acid substituted hydrotalcite[10] (Parts by mass) | 5 | 5 | 5 | 5 | 5 | 5 | 5 | 5 | 5 | 5 |
| Zeolite[11] (Parts by mass) | 1 | 1 | 1 | 1 | 1 | 1 | 1 | 1 | 1 | 1 |
| Stearoylbenzoylmethane[12] (Parts by mass) | 0.3 | 0.3 | 0.3 | 0.3 | 0.3 | 0.3 | 0.3 | 0.3 | 0.3 | 0.3 |
| Oxidization inhibitor[13] (Parts by mass) | 1 | 1 | 1 | 1 | 1 | 1 | 1 | 1 | 1 | 1 |
| Ultraviolat absorber[14] (Parts by mass) | 0.3 | 0.3 | 0.3 | 0.3 | 0.3 | 0.3 | 0.3 | 0.3 | 0.3 | 0.3 |
| Light stabilizer[15] (Parts by mass) | 0.2 | 0.2 | 0.2 | 0.2 | 0..2 | 0.2 | 0.2 | 0.2 | 0.2 | 0.2 |
| Release agent A (zinc stearate)[16] (Parts by mass) | 0.2 | 0.2 | 0.2 | 0.2 | 0.2 | 0.2 | 0.2 | 0.2 | 0.2 | 0.2 |
| Release agent B (12-hydroxy stearic acid)[17] (Parts by mass) | 0.4 | 0.4 | 0.4 | 0.4 | 0.4 | 0.4 | 0.4 | 0.4 | 0.4 | 0.4 |
| Dusting agent[18] (Parts by mass) | 20 | 20 | 20 | 20 | 20 | 20 | 20 | 20 | 20 | 20 |
| Pigment (carbon black)[19] (Parts by mass) | 5 | 5 | 5 | 5 | 5 | 5 | 5 | 5 | 5 | 5 |
| Elongation at break (initial state) (%) | 192 | 196 | 230 | 168 | 182 | 213 | 142 | 189 | 192 | 192 |
| Elongation at break (heated for 100 hours) (%) | 163 | 172 | 152 | 151 | 164 | 161 | 113 | 155 | 158 | 132 |
| Elongation at break (heated for 250 hours) (%) | 162 | 134 | 138 | 113 | 113 | 99 | 99 | 132 | 106 | 88 |

TABLE 2

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 |
|---|---|---|---|---|---|---|---|---|---|---|---|
| Vinyl chloride resin particle A[1] (Parts by mass) | 100 | — | — | — | — | — | — | — | — | — | — |
| Vinyl chloride resin particle B[2] (Parts by mass) | — | — | — | — | — | — | — | — | — | — | — |
| Vinyl chloride resin particle C[3] (Parts by mass) | — | 100 | — | — | — | — | — | — | — | — | — |
| Vinyl chloride resin particle D[4] (Parts by mass) | — | — | 100 | 100 | 100 | 100 | — | — | — | — | — |
| Vinyl chloride resin particle E[5] (Parts by mass) | — | — | — | — | — | — | 100 | 100 | — | — | — |
| Vinyl chloride resin particle F[6] (Parts by mass) | — | — | — | — | — | — | — | — | 100 | 100 | 100 |
| Plasticizer A (trimellitate)[7] (Parts by mass) | — | 90 | — | 55 | 85 | 115 | 55 | 115 | — | 48 | 98 |
| Plasticizer B (pyromellitate)[8] (Parts by mass) | 210 | — | 115 | 60 | 30 | — | 60 | — | 98 | 50 | — |
| Plasticizer C (epoxidized soybean oil)[9] (Parts by mass) | 5 | 5 | 5 | 5 | 5 | 5 | 5 | 5 | 5 | 5 | 5 |
| Perchloric acid substituted hydrotalcite[10] (Parts by mass) | 5 | 5 | 5 | 5 | 5 | 5 | 5 | 5 | 5 | 5 | 5 |
| Zeolite[11] (Parts by mass) | 1 | 1 | 1 | 1 | 1 | 1 | 1 | 1 | 1 | 1 | 1 |
| Stearoylbenzoylmethane[12] (Parts by mass) | 0.3 | 0.3 | 0.3 | 0.3 | 0.3 | 0.3 | 0.3 | 0.3 | 0.3 | 0.3 | 0.3 |
| Oxidization inhibitor[13] (Parts by mass) | 1 | 1 | 1 | 1 | 1 | 1 | 1 | 1 | 1 | 1 | 1 |
| Ultraviolat absorber[14] (Parts by mass) | 0.3 | 0.3 | 0.3 | 0.3 | 0.3 | 0.3 | 0.3 | 0.3 | 0.3 | 0.3 | 0.3 |
| Light stabilizer[15] (Parts by mass) | 0.2 | 0.2 | 0.2 | 0.2 | 0..2 | 0.2 | 0.2 | 0.2 | 0.2 | 0.2 | 0.2 |
| Release agent A (zinc stearate)[16] (Parts by mass) | 0.2 | 0.2 | 0.2 | 0.2 | 0.2 | 0.2 | 0.2 | 0.2 | 0.2 | 0.2 | 0.2 |
| Release agent B (12-hydroxy stearic acid)[17] (Parts by mass) | 0.4 | 0.4 | 0.4 | 0.4 | 0.4 | 0.4 | 0.4 | 0.4 | 0.4 | 0.4 | 0.4 |
| Dusting agent[18] (Parts by mass) | 20 | 20 | 20 | 20 | 20 | 20 | 20 | 20 | 20 | 20 | 20 |
| Pigment (carbon black)[19] (Parts by mass) | 5 | 5 | 5 | 5 | 5 | 5 | 5 | 5 | 5 | 5 | 5 |
| Elongation at break (initial state) (%) | — | 98 | 83 | 112 | 145 | 162 | 123 | 164 | 36 | 61 | 141 |
| Elongation at break (heated for 100 hours) (%) | — | 9 | — | 64 | 76 | 94 | 59 | 107 | — | — | 63 |

TABLE 2-continued

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 |
|---|---|---|---|---|---|---|---|---|---|---|---|
| Elongation at break (heated for 250 hours) (%) | — | — | — | — | — | — | — | — | — | — | — |

[1] TH-3800, produced by Taiheiyo Enbi Co., Ltd. (average polymerization degree: 3800, average particle size: 133 μm)
[2] Kanevinyl KS-3000, produced by Kaneka Corporation (average polymerization degree of 3000, average particle size of 128 μm)
[3] ZEST2500Z, produced by Shin Daiichi Enbi Co., Ltd. (average polymerization degree of 2500, average particle size of 130 μm)
[4] ZEST2000Z, produced by Shin Daiichi Enbi Co., Ltd. (average polymerization degree: 2000; average particle size: 124 μm)
[5] ZEST1700Z, produced by Shin Daiichi Enbi Co., Ltd. (average polymerization degree: 1700; average particle size: 124 μm)
[6] ZEST1300S, produced by Shin Daiichi Enbi Co., Ltd. (average polymerization degree: 1300; average particle size: 113 μm)
[7] TRIMEX N-08, produced by Kao Corporation
[8] ADEKA CIZER-UL-80, produced by ADEKA CORPORATION
[9] ADEKA CIZER-O-130S, produced by ADEKA CORPORATION
[10] ALCAMIZER5, produced by Kyowa Chemical Industry Co., Ltd.
[11] MIZUKALIZER DS, produced by MIZUSAWA INDUSTRIAL CHEMICALS, LTD.
[12] Karenz DK-1, produced by Showa Denko K.K.
[13] IRGANOX1010, produced by BASF
[14] TINUVIN P, produced by BASF
[15] ADEKA STAB LA-67, produced by ADEKA CORPORATION
[16] SAKAI SZ2000, produced by Sakai Chemical Industry Co., Ltd.
[17] ADEKA STAB LS-10, produced by ADEKA CORPORATION
[18] ZEST PQLTX, produced by Shin Daiichi Enbi Co., Ltd. (average polymerization degree: 800, average particle size: 2 μm)
[19] DA PX 1720(A) black, produced by Dainichiseika Color & Chemicals Mfg. Co., Ltd.

When a laminate was obtained by stacking the polyurethane foam molded article on a vinyl chloride resin molded article which had been obtained by subjecting, to powder slush molding, each of the vinyl chloride resin compositions of Examples 1 to 10 for powder molding, the vinyl chloride resin molded article in the laminate exhibited high elongations at break at the initial stage and after being heated, respectively, and therefore, had a great thermal aging resistance.

In regard to the vinyl chloride resin composition of Comparative Example 1 for powder molding which included an excessively large amount of the plasticizer, the plasticizer was not absorbed by the vinyl chloride resin particles. Therefore, the plasticizer was like wet soil and was not dried up. As a result, the vinyl chloride resin composition for powder molding was not molded. In a case where a laminate was obtained by stacking the polyurethane foam molded article and a vinyl chloride resin molded article which had been obtained by subjecting, to powder slush molding, the vinyl chloride resin composition of Comparative Example 2 for powder molding which vinyl chloride resin composition included an excessively small amount of the plasticizer, the vinyl chloride resin molded article exhibited low elongations at break at the initial state and after being heated, and therefore, had a low thermal aging resistance. In regard to the vinyl chloride resin compositions of Comparative Examples 3 through 11, vinyl chloride resin which constituted the vinyl chloride resin particles had an average polymerization degree of less than 2300. When a laminate was obtained by stacking the polyurethane foam molded article on a vinyl chloride resin molded article which was obtained by subjecting, to powder slush molding, each of the vinyl chloride resin compositions of Comparative Examples 3 through 11 for powder molding, the vinyl chloride resin molded article of the laminate exhibited low elongations at break at the initial state and after being heated, and therefore, had a low thermal aging resistance.

INDUSTRIAL APPLICABILITY

A vinyl chloride resin composition for powder molding is suitably molded into skins of automobile interior materials such as an instrument panel and a door trim.

The invention claimed is:

1. A vinyl chloride resin composition for powder molding, comprising:
    100 parts by mass of (a) vinyl chloride resin particles having an average polymerization degree of 2300 to 4100; and
    100 parts by mass to 200 parts by mass of (b) a plasticizer containing a trimellitate plasticizer and a pyromellitate plasticizer, wherein the plasticizer (b) contains 65 parts by mass to 165 parts by mass of the trimellitate plasticizer, and 35 parts by mass to 135 parts by mass of the pyromellitate plasticizer, provided that a total amount of the plasticizer (b) remains in a range of 100 to 200 parts by mass,
    wherein a plasticizer other than the trimellitate plasticizer and the pyromellitate plasticizer is contained in the plasticizer (b) in a total amount of not more than 3.6% by mass.

2. The vinyl chloride resin composition for powder molding as set forth in claim 1, wherein (a) the vinyl chloride resin particles have an average polymerization degree of 3100 to 4100.

3. The vinyl chloride resin composition for powder molding as set forth in claim 1, wherein (a) the vinyl chloride resin particles having the average polymerization degree of 2300 to 4100 have an average particle size of 50 μm to 500 μm.

4. The vinyl chloride resin composition for powder molding as set forth in claim 1, wherein (b) the plasticizer contains epoxidized soybean oil.

5. The vinyl chloride resin composition for powder molding as set forth in claim 1, further comprising 0.1 parts by mass to 3 parts by mass of saturated fatty acid having a hydroxyl group and/or metallic soap with respect to 100 parts by mass of (a) the vinyl chloride resin particles having the average polymerization degree of 2300 to 4100.

6. The vinyl chloride resin composition for powder molding as set forth in claim 1, further comprising 0.5 part by mass to 10 parts by mass of hydrotalcite with respect to 100 parts by mass of (a) the vinyl chloride resin particles having the average polymerization degree of 2300 to 4100.

7. The vinyl chloride resin composition for powder molding as set forth in claim 1, further comprising 0.1 part by mass to 5 parts by mass of zeolite with respect to 100 parts by mass of (a) the vinyl chloride resin particles having the average polymerization degree of 2300 to 4100.

8. The vinyl chloride resin composition for powder molding as set forth in claim 1, further comprising 0.1 part by mass to 5 parts by mass of a β-diketone with respect to 100 parts by mass of (a) the vinyl chloride resin particle having the average polymerization degree of 2300 to 4100.

9. The vinyl chloride resin composition for powder molding as set forth in claim 1, further comprising not more than 35 parts by mass of a dusting agent with respect to 100 parts by mass of (a) the vinyl chloride resin particles having the average polymerization degree of 2300 to 4100.

10. A vinyl chloride resin molded article obtained by subjecting, to powder slush molding, the vinyl chloride resin composition for powder molding as set forth in claim 1.

11. An automobile instrument panel skin comprising the vinyl chloride resin molded article as set forth in claim 10.

12. A laminate in which a polyurethane foam molded article and the vinyl chloride resin molded article as set forth in claim 10 are stacked.

13. An automobile instrument panel comprising the laminate as set forth in claim 12.

14. The vinyl chloride resin composition for powder molding as set forth in claim 1, wherein: the plasticizer (b) contains 65 parts by mass to 160 parts by mass of the trimellitate plasticizer, provided that the total amount of the (b) plasticizer remains in a range of 100 to 200 parts by mass.

15. The vinyl chloride resin composition for powder molding as set forth in claim 1, wherein the plasticizer other than the trimellitate plasticizer and the pyromellitate plasticizer is contained in the plasticizer (b) in an amount of not more than 5% by mass.

16. The vinyl chloride resin composition for powder molding as set forth in claim 1, wherein the plasticizer other than the trimellitate plasticizer and the pyromellitate plasticizer is contained in the plasticizer (b) in an amount of not less than 1% and not more than 3.6% by mass.

17. A vinyl chloride resin composition for powder molding, comprising:
   100 parts by mass of (a) vinyl chloride resin particles having an average polymerization degree of 2300 to 4100; and
   100 parts by mass to 200 parts by mass of (b) a plasticizer containing a trimellitate plasticizer and a pyromellitate plasticizer, wherein the plasticizer (b) contains 65 parts by mass to 165 parts by mass of the trimellitate plasticizer, and 35 parts by mass to 135 parts by mass of the pyromellitate plasticizer, provided that a total amount of the plasticizer (b) remains in a range of 100 to 200 parts by mass,
   wherein a plasticizer other than the trimellitate plasticizer and the pyromellitate plasticizer is contained in the plasticizer (b) in a total amount of not more than 10% by mass,
   wherein the pyromellitate plasticizer is a pyromellitic acid tetra alkyl ester having 8 carbons.

* * * * *